United States Patent
Tsai et al.

(10) Patent No.: US 11,272,084 B2
(45) Date of Patent: Mar. 8, 2022

(54) AUDIO AND IMAGE SENSORS' ACTIVATION

(71) Applicant: Hewlett-Packard Development Company, L.P., Spring, TX (US)

(72) Inventors: Ming-Shan Tsai, Taipei (TW); Szu-Yu Chen, Taipei (TW); Wei-Chih Tsao, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/966,342

(22) PCT Filed: Jan. 30, 2018

(86) PCT No.: PCT/US2018/015966
§ 371 (c)(1),
(2) Date: Jul. 30, 2020

(87) PCT Pub. No.: WO2019/151990
PCT Pub. Date: Aug. 8, 2019

(65) Prior Publication Data
US 2020/0374427 A1    Nov. 26, 2020

(51) Int. Cl.
*H04N 5/225*    (2006.01)
*H04N 5/232*    (2006.01)
*H04N 7/14*    (2006.01)

(52) U.S. Cl.
CPC ....... *H04N 5/2253* (2013.01); *H04N 5/23299* (2018.08); *H04N 7/142* (2013.01)

(58) Field of Classification Search
CPC ............. H04N 7/15; H04N 1/42; H04N 7/142
USPC ...................................... 348/14.08
See application file for complete search history.

(56) References Cited

U.S. PATENT DOCUMENTS

| 9,503,679 B2 | 11/2016 | Roh et al. | |
| 2008/0218583 A1* | 9/2008 | Girish | H04N 5/2251 348/14.08 |
| 2013/0088639 A1 | 4/2013 | Mundt | |
| 2013/0222609 A1 | 8/2013 | Soffer | |
| 2015/0163383 A1 | 6/2015 | Barangan | |

FOREIGN PATENT DOCUMENTS

| KR | 20140022611 A | 2/2014 |
| WO | WO-2015034120 A1 | 3/2015 |

* cited by examiner

*Primary Examiner* — Maria El-Zoobi
(74) *Attorney, Agent, or Firm* — Lakshmi Kumaran & Sridharan

(57) ABSTRACT

Examples of an audio-video (AV) apparatus are described herein. In an example, the AV apparatus includes a base member. The AV apparatus further includes an AV unit including an image sensor and an audio sensor. The AV unit being actuated to move, with respect to the base member, either in a first direction and activate the audio sensor or in a second direction and activate the image sensor and the audio sensor.

17 Claims, 4 Drawing Sheets

AUDIO AND IMAGE SENSORS' ACTIVATION

BACKGROUND

Audio-video (AV) apparatuses may include an audio sensor and an image sensor to enable users to take pictures, capture audio and video, and to participate in videocalls. AV apparatuses may be integrated within electronic devices or may be externally mounted on the electronic devices to provide multi-media functionalities to the users.

BRIEF DESCRIPTION OF DRAWINGS

The following detailed description references the drawings, wherein.

DETAILED DESCRIPTION

Figure 1:
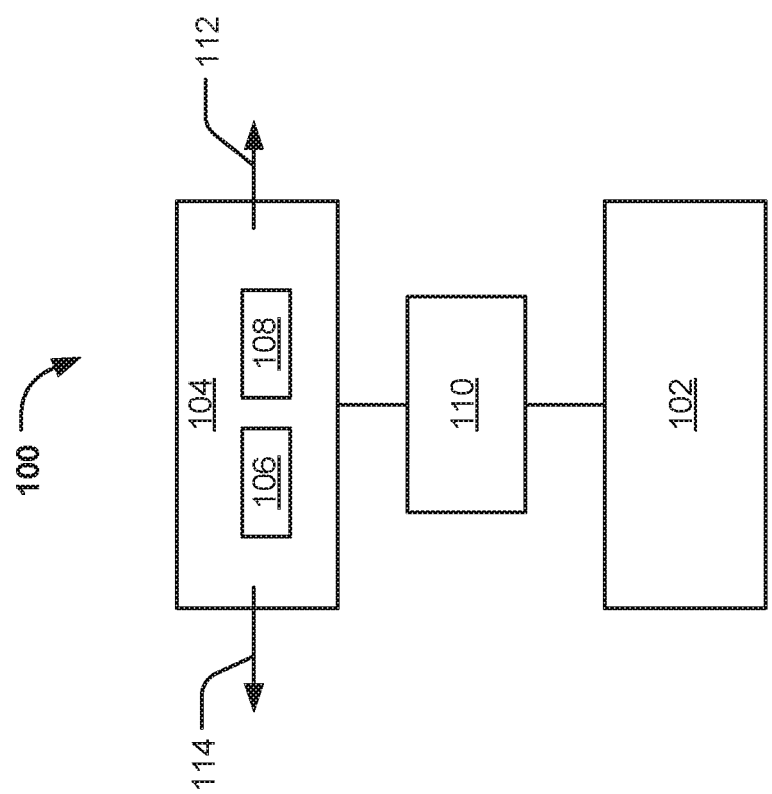
FIG. 1 illustrates a schematic diagram of an audio-video apparatus, according to an example.

Electronic devices, such as laptops, may include audio-video (AV) devices, such as an image sensor and an audio sensor, to provide various multi-media functions. The image sensor may be a camera, and an audio sensor may be a microphone. The AV devices may be mounted on a bezel of a display of the electronic device. As a result, the AV devices may generally be on a front side of the electronic device, facing a user, while the electronic device is in use. Such positioning of the AV devices may jeopardize privacy of the user of the electronic device. For example, an unauthorized person may access the image sensor or the audio sensor to capture video or audio, or both of a user, without the knowledge of the user.

To prevent any malware attack, the AV devices may be activated by switches. For example, a switch may allow a user of the electronic device to activate the AV device. However, switch activated AV devices generally do not provide the user with the flexibility to selectively activate a function of the AV device, i.e., the audio sensor or the image sensor or, both.

The present subject matter describes AV apparatuses able to be implemented in electronic devices. An AV apparatus of the present subject matter includes an AV unit having an image sensor and an audio sensor. The AV apparatus facilitates a user of an electronic device to selectively activate the audio sensor or both the audio sensor as well as the image sensor.

In an example, the AV apparatus includes a base member. In an example, the base member can be coupled to a display of the electronic device from a back side of the display, so that the AV apparatus is not facing a user of the electronic device while the user is in front of the display. Further, the AV apparatus includes an actuation unit coupled between the AV unit and the base member. The actuation unit is designed to be manually actuated by the user of the electronic device to selectively activate a functionality of the AV unit. For example, the user may actuate the actuation unit to activate either the audio sensor, or both the image sensor and the audio sensor.

The actuation of the actuation unit may cause the AV unit to swing upwards along an edge of the display of the electronic device, which results in the AV unit being visible to the user. Thus, based on the functionality selected by the user, the audio sensor or both the audio sensor and the image sensor may be brought to face the user for the purpose of capturing audio or both audio and video.

As the AV apparatus is positioned behind the display unit of the electronic device, the AV unit when not activated is hidden from a user. Further, the actuation unit allows the user to select between audio and audio-video functionalities of the AV unit. As the actuation unit is actuated by an apparent action of the user, even in case of a malware attack, the privacy of the user accessing the electronic device is not compromised.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following description does not limit the disclosed examples. Instead, the proper scope of the disclosed examples may be defined by the appended claims.

FIG. 1 illustrates a schematic diagram of an audio-video (AV) apparatus 100, according to an example. The AV apparatus 100 may be mounted on an electronic device (not shown in FIG. 1). Examples of the electronic device may include, but are not limited to, a personal computer, a laptop, a tablet, and a personal digital assistant (PDA).

The AV apparatus 100 includes a base member 102. The base member 102 may be a plate-like element by which the AV apparatus 100 can be fixedly coupled to an electronic device. In an example, the base member 102 may be coupled to an enclosure having a display unit of the electronic device. The enclosure may be a casing or a cover unit of the electronic device. The base member 102, and therefore the AV apparatus 100, may be coupled to a side of the enclosure which is opposite a side facing a user while the user is accessing the electronic device. In an example, the base member 102 may be coupled to the electronic device by screws or other fastening mechanism.

The AV apparatus 100 further includes an AV unit 104. The AV unit 104 includes an image sensor 106 and an audio sensor 108. In an example, the image sensor 106 may include a camera to capture an image or a video of a user of the electronic device. The camera may include a video camera, a still camera, or any other type of image capturing device. The audio sensor 108 may include a microphone to capture an audio, for example, voice of the user of the electronic device. The AV unit 104 thereby facilitates capturing images, audios, and may allow a user to participate in a video call. Although the AV unit 104 is shown to include one image sensor 106 and one audio sensor 108, the AV unit 104 may include more number of image sensors and audio sensors.

In an example, the AV unit 104 may be connected to a printed circuit board (PCB) or a motherboard of the electronic device through a cable (not shown in FIG. 1). The cable may be any wire cable that can support communication between the AV unit 104 and the PCB. Example of the cable may include, but is not limited to, a High-Definition Multimedia Interface (HDMI) cable.

The AV apparatus 100 further includes an actuation unit 110. The actuation unit 110 is coupled between the AV unit 104 and the base member 102. The actuation unit 110 may be a mechanical lever-like element that couples the AV unit 104 with the base member 102. Further, the actuation unit 110 may be manually operable by the user to selectively activate a functionality of the AV apparatus 100. For example, the actuation unit 110 can be selectively actuated to activate either the audio sensor 108 or both of the image sensor 106 and the audio sensor 108, based on the selected functionality.

Upon actuation, the actuation unit 110 moves the AV unit 104, with respect to the base member 102, either in a first direction, as depicted by arrow 112 or in a second direction, as depicted by arrow 114. While moving the AV unit 104 in the first direction 112, the actuation unit 110 also activates the audio sensor 108. When the AV unit 104 is moved in the second direction 114, the actuation unit 110 activates both the image sensor 106 and the audio sensor 108. As the base member 102 is fixedly coupled to the electronic device, the AV unit 104 swings either towards a left side of the base member 102 or towards the right side of the base member 102. The swing action brings the AV unit 104 above the enclosure of the electronic device, such that the AV unit 104 faces a user accessing the electronic device on to which the AV unit 104 is mounted.

The placement of the base member 102 behind the display unit of the electronic device prevents unauthorized access to the image sensor 106 or the audio sensor 108 of the AV apparatus 100. Further, the actuation unit 110 provides the user with the flexibility to select between audio and audio-video functionality of the AV apparatus 100. Based on the functionality chosen by the user, the AV unit 104 is moved either in direction 112 or in direction 114, so as to be visible to the user accessing the electronic device.

Figure 2:
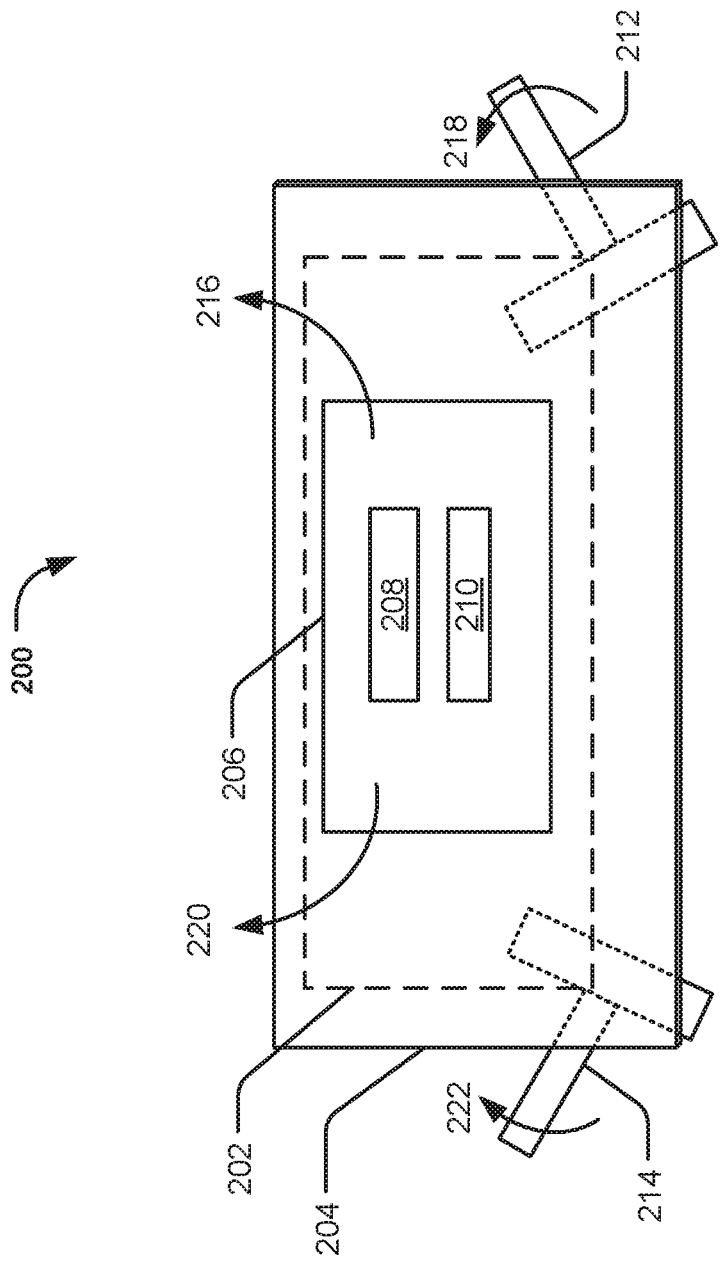
FIG. 2 illustrates a schematic diagram of an audio-video apparatus, according to an example.

FIG. 2 illustrates a schematic diagram of an audio-video (AV) apparatus 200, according to an example. The AV apparatus 200 includes a base member 202 and a frame member 204 (shown by dashed lines for being behind the frame member 204). The base member 202 may be the same as the base member 102 described with reference to FIG. 1. The base member 202 may be coupled to an enclosure having a display unit of an electronic device. The frame member 204 may be a plate-like element that may be disposed on the base member 202. In an example, the frame member 204 may be movably coupled to the base member 202.

The AV apparatus 200 also includes an AV unit 206 mounted on the frame member 204. The AV unit 206 may be the same as the AV unit 104 described with reference to FIG. 1. The AV unit 206 includes an image sensor 208 and an audio sensor 210. The AV unit 206 may be fixedly coupled to the frame member 204. In an example, the frame member 204 may include openings for accommodating the image sensor 208 and the audio sensor 210.

Further, the AV apparatus 200 includes a first actuator 212 and a second actuator 214. The first actuator 212 and the second actuator 214 is coupled to the base member 202 and the frame member 204. Some portions of the first actuator 212 and the second actuator 214 is shown by dashed lines to indicate that those portions of the first actuator 212 and the second actuator 214 are behind the frame member 204. In an example, the first actuator 212 and the second actuator 214 may respectively be a swing bracket that is connected between the base member 202 and the frame member 204 through screws or other fastening mechanism. The swing bracket may be made of a steel material, such as a Steel Galvanized Cold Common (SGCC) material. The shape and profile of the first actuator 212 and the second actuator 214 are not restricted to the ones shown in FIG. 2. The first actuator 212 and the second actuator 214 can be selectively actuated to activate either the audio sensor 210 or both of the image sensor 208 and the audio sensor 210, based on the selected functionality of the AV apparatus 200.

The first actuator 212 is actuatable to move the frame member 204 with respect to the base member 202 in a first direction 216. For example, a user accessing the electronic device may actuate the first actuator 212 by manually moving the first actuator 212 along a direction as depicted by arrow 218. Such movement of the first actuator 212, causes the first actuator 212 to contact the AV unit 206 and activate the audio sensor 210. For example, the contact of the first actuator 212 with the AV unit 208 completes a circuit that results in activation of the audio sensor 210. In addition, the movement of the first actuator 212 along the direction 218, swings the frame member 204 in the first direction 216. The swing motion of the frame member 204, in turn, results in the movement of the AV unit 206 from behind the enclosure of the electronic device to above an edge of the enclosure of the electronic device. Thus, the AV unit 206 becomes visible to the user accessing the electronic device.

Likewise, the second actuator 214 is actuatable to move the frame member 204 with respect to the base member 202 in a second direction 220. The user may actuate the second actuator 214 by manually moving the second actuator 214 along a direction as depicted by arrow 222. Such movement of the second actuator 214, causes the second actuator 214 to contact the AV unit 206 and activate the image sensor 208 and the audio sensor 210. In addition, the movement of the second actuator 214 along the direction 222, swings the frame member 204 in the second direction 220. As mentioned above, the swing motion of the frame member 204, results in the movement of the AV unit 206 from behind the enclosure of the electronic device to above an edge of the enclosure of the electronic device.

Figure 3:
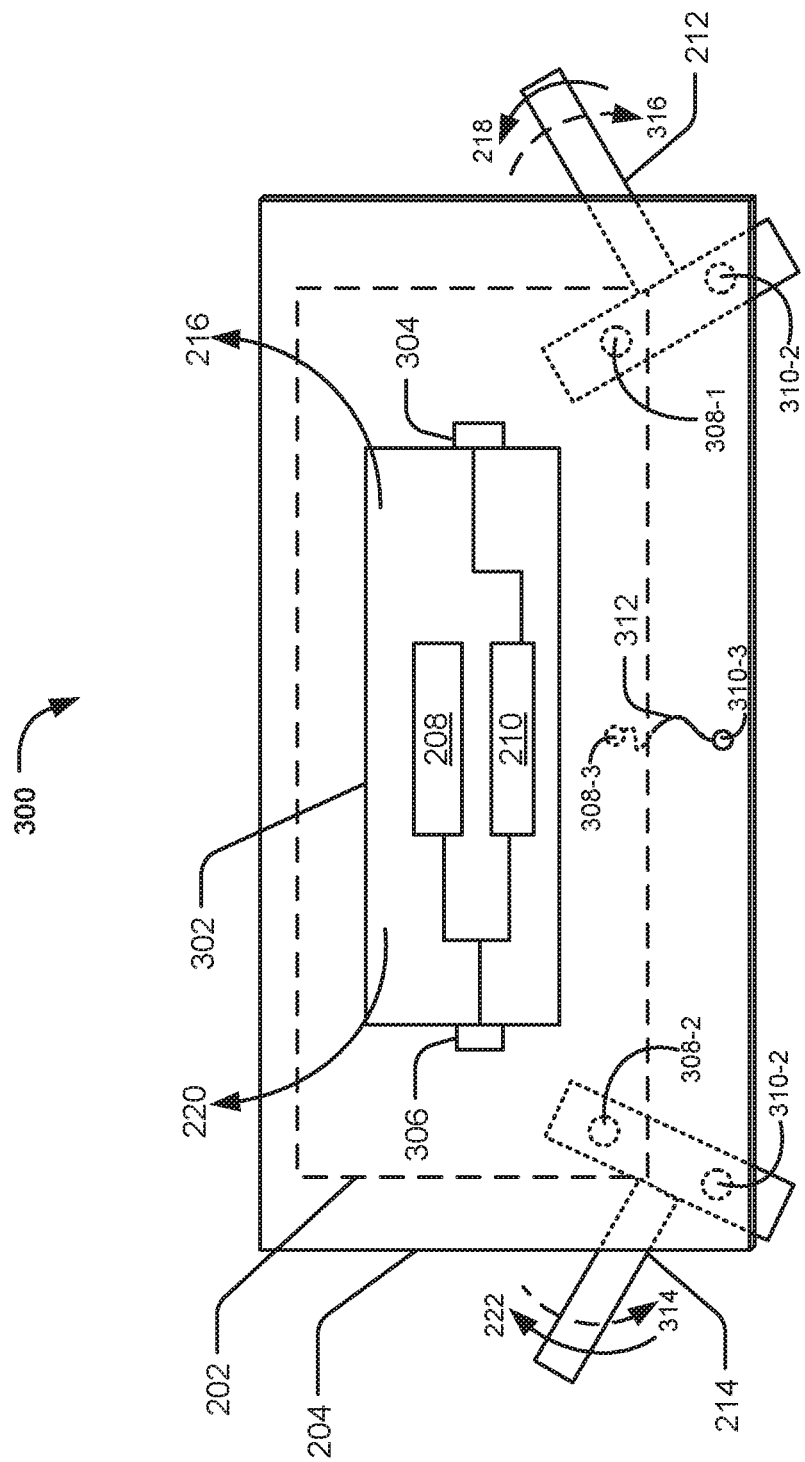
FIG. 3 illustrates a schematic diagram of an audio-video apparatus, according to an example.

FIG. 3 illustrates a schematic diagram of an audio-video (AV) apparatus 300, according to an example. The AV apparatus 300 includes the base member 202 and the frame member 204 (shown by dashed lines for being behind the frame member 204). The base member 202 can be coupled to an electronic device. In an example, the base member 202 may be coupled to an enclosure having a display unit of the electronic device. In an example, the frame member 204 may be movably coupled to the base member 202.

The AV apparatus 300 further include the AV unit 302 mounted on the frame member 204. The AV unit 302 is connected to the electronic device via a cable (not shown). For example, the AV unit 302 may be connected to a PCB of the electronic device through a (High-Definition Multimedia Interface) HDMI cable. The AV unit 302 may include an image sensor 208, an audio sensor 210, a first switch 304, and a second switch 306. The first switch 304 is electrically coupled to the audio sensor 210 and the second switch 306 is electrically coupled to the image sensor 208 and the audio sensor 210. In an example, the frame member 204 may include apertures (not shown) for the image sensor 208 and the audio sensor 210.

The AV apparatus 300 further includes the first actuator 212 and the second actuator 214 coupled to the base member 202 and the frame member 204. Some portions of the first actuator 212 and the second actuator 214 is shown by dashed lines to indicate that those portions of the first actuator 212 and the second actuator 214 are behind the frame member 204. In an example, the frame member 204 may include openings (not shown) to accommodate the first actuator 212 and the second actuator 214. The first actuator 212 and the second actuator 214 may be pivotally coupled to the base member 202 with screws 308-1 and 308-2. Thus, the screws 308-1 and 308-2 allow the first actuator 212 and the second actuator 214 to rotate freely about an axis while being fixed to the base member 202. Further, the first actuator 212 and the second actuator 214 may be connected to the frame member 204 with screws 310-1 and 310-2.

The first actuator 212 and the second actuator 214 can be selectively actuated to activate either the audio sensor 210 or both of the image sensor 208 and the audio sensor 210, based on the selected functionality of the AV apparatus 300. The first actuator 212 is actuatable to move the AV unit 302 in the first direction 216 and activate the audio sensor 210. The user accessing the electronic device may pull the first actuator 212 in the direction 218. As a result, the first actuator 212 contacts with the first switch 304 to activate the audio sensor 210. Further, the second actuator 214 is actuatable to move the AV unit 302 in the second direction 220 to activate the image sensor 208 and the audio sensor 210. Upon manual actuation by the user, the second actuator 214 is moved in the direction 222 and contacts the second switch 306 to activate the image sensor 208 and the audio sensor 210.

In an implementation, the AV apparatus 300 may include a biasing element 312. In an example, the biasing element 312 may be a twist spring. One end of the biasing element 312 is coupled to the base member 202 and another end of the biasing element 312 is coupled to the frame member 204. As is the case with the first actuator 212 and the second actuator 214, the biasing element 312 may also be pivotally coupled to the base member 202 with the screw 308-3. Further, the biasing element 312 is fixedly connected to the frame member 204 with the screw 310-3. When none of the first actuator 212 and the second actuator 214 is actuated, the biasing element 312 facilitates holding the frame member 204 behind the enclosure of the electronic device. Whereas, upon actuation of the first actuator 212 or the second actuator 214, the biasing element 312 is biased to hold the frame member 204 in a position associated with an actuated position of the first actuator 212 or the second actuator 214.

In operation, in order to use the audio functionality of the AV apparatus 300, the user may move the first actuator 212 in an upward direction, as depicted by arrow 218. The movement of the first actuator 212 in the upward direction 218 indicates the actuated position of the first actuator 212. As the frame member 204 is movably coupled to the base member 202 through the first actuator 212 and the second actuator 214, any movement of the first actuator 212 or the second actuator 214, also causes the frame member 204 to move in the position that is associated with the actuated position of the first actuator 212 or the second actuator 214. Thus, the frame member 204 moves, with respect to the base member 202, in the first direction 216. This causes the biasing element 312 to bias. The movement of the first actuator 212 and the frame member 204 results in a swing motion, which causes the AV unit 302 to move in the first direction 216.

Meanwhile, due to the movement of the first actuator 212, the first actuator 212 presses the first switch 304. As a result, a circuit for the audio sensor 210 is completed and audio sensor 210 becomes activated. With the audio sensor 210 activated and the AV unit 302 swung above the enclosure in the direction 216, the user accessing the electronic device may use the audio sensor 210 through the apertures in the frame member 204. In addition, the movement of the first actuator 212 along the direction 218 causes the second actuator 214 to move in the direction depicted by arrow 224.

In similar manner, in order to use AV functionality of the AV apparatus 300, the user may move the second actuator 214 in an upward direction, as depicted by arrow 222. This causes the biasing element 312 to bias. The movement of the second actuator 214 along the direction 222 also makes the first actuator 212 to move in the direction depicted by arrow 226. As a result, the frame member 204 may easily move in the second direction 220, with respect to the base member 202.

The movement of the second actuator 214 and the frame member 204 results in a swing motion, which causes the AV unit 302 to move in the second direction 220. Further, the movement of the second actuator 214 results in pressing of the second switch 306. As a result, a circuit for the image sensor 208 and the audio sensor 210 is completed and the AV functionality of the AV apparatus 300 become activated. The user may access the image sensor 208 and the audio sensor 210 through the apertures of the frame member 204.

Accordingly, the AV apparatus 300 prevents unauthorized access to the image sensor 208 or the audio sensor 210. Further, the AV apparatus 300 provides the user with the flexibility to select between audio and audio-video functionality of the AV apparatus 300 by actuating the first actuator 212 and the second actuator 214. Based on the selective activation of the AV functionality, the AV unit 302 may be moved along the directions 216 and 220. The AV apparatus 300 is made visible to the user while the user is accessing the electronic device and not be visible at all times.

Figure 4:
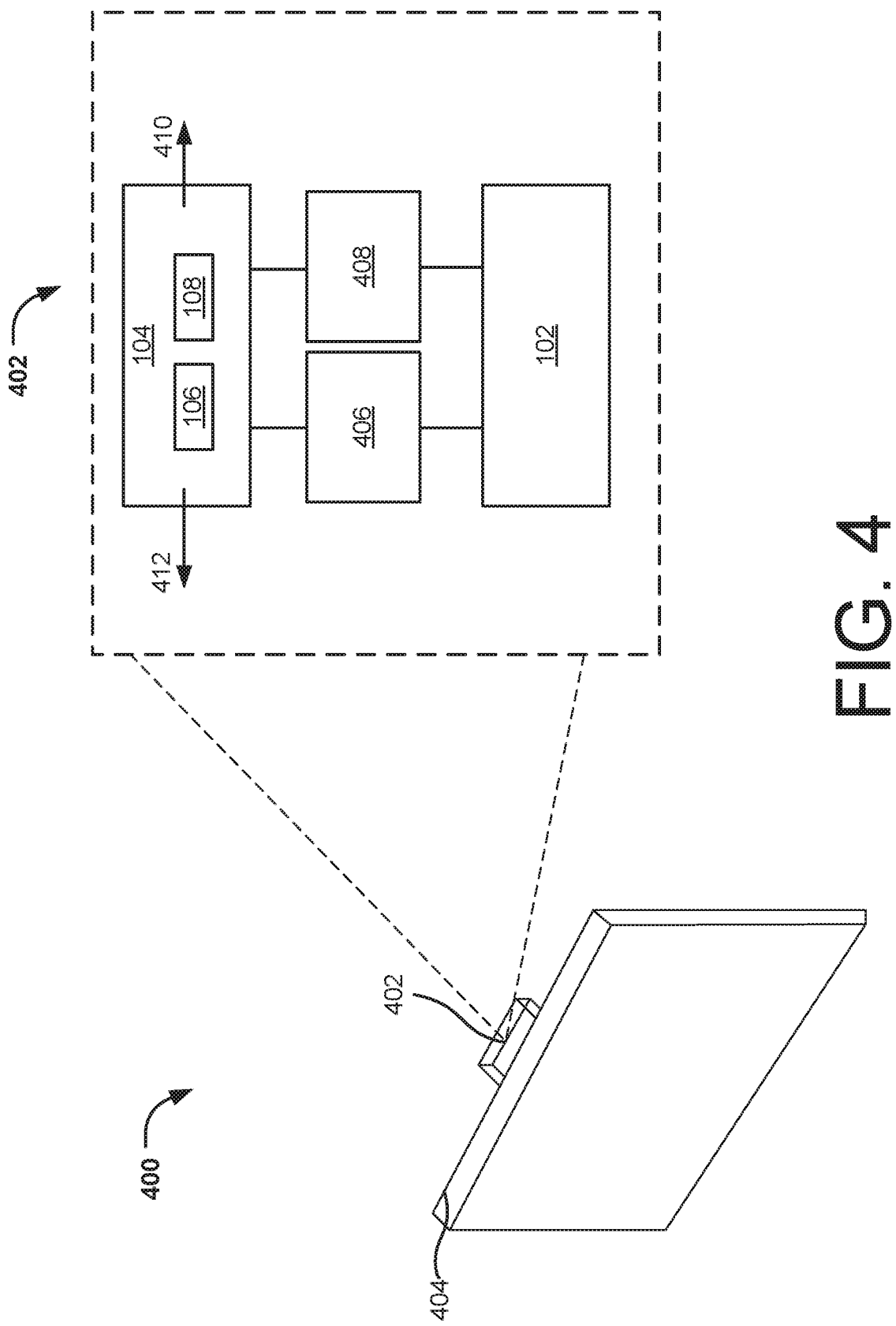
FIG. 4 illustrates an electronic device implementing an audio-video apparatus, according to an example.

FIG. 4 illustrates an electronic device 400 embedded with an audio-video (AV) apparatus 402, according to an example. In the present example, the electronic device 400 is depicted as a display monitor or a display screen, however, the electronic device 400 may include a laptop, a personal computer (PC), a smartphone, a tablet, a notebook, and the like. The AV apparatus 402 may be any one of the AV apparatus 100, 200, or 300.

The electronic device 400 includes an enclosure 404. In an example, the enclosure 404 may be a body or housing of a laptop, a personal computer, and the like. In an example, the enclosure 404 may include a display unit. The AV apparatus 402 may be disposed on the enclosure 404, such as behind the display unit. Thus, the AV apparatus 402 remains hidden from a user accessing the electronic device 400.

The AV apparatus 402 includes the base member 102 coupled to the enclosure 404. In an example, the base member 102 may be fixedly coupled to the enclosure 404 through fastening mechanisms, such as screws or an adhesive. The AV apparatus 402 further includes an AV unit 104. The AV unit 104 includes an image sensor 106 and an audio sensor 108. In an example, the image sensor 106 may include a camera to capture an image or a video of a user of the electronic device. The camera may include a video camera, a still camera, or any other type of image capturing device. The audio sensor 108 may include a microphone to capture an audio, for example, voice of the user of the electronic device. The AV unit 104 thereby facilitates the user to capture images, audios as well as to participate in a video call.

In an example, the AV unit 104 may be connected to a printed circuit board (PCB) or a motherboard of the electronic device 400 through a cable (not shown). The cable may act as a bridge for transferring signals and power between the PCB and the AV unit 104. The AV unit 104 may communicate with the electronic device 400 through a device driver to work with an AV application hosted by the electronic device 400.

The AV apparatus 402 may also include a first actuator 406 and a second actuator 408. The first actuator 406 and the second actuator 408 is coupled between the AV unit 104 and the base member 102. In an example, the first actuator 406 and the second actuator 408 may be a swing bracket that is connected between the base member 102 and the AV unit 104 through screws or other fastening mechanism. The first actuator 406 and the second actuator 408 can be selectively actuated to activate either the audio sensor 108 or both the image sensor 106 and the audio sensor 108, based on the selected functionality of the AV apparatus 402.

The AV apparatus 402 may further include a switching unit (not shown). The switching unit may include a first switch and a second switch. The first switch is electrically coupled to the audio sensor 108 and the second switch is electrically coupled to the image sensor 106 and the audio sensor 108.

The first actuator 406 is actuatable to move the AV unit 104 with respect to the base member 102 in a first direction 410. In an example, the first actuator 406 may be manually operable by a user accessing the electronic device 400. Upon actuation, the AV unit 104 moves with respect to the base member 102, in a first direction, as depicted by arrow 410. Further, actuation of the first actuator 406 results in the first actuator 406 contacting with the first switch, and thus activating the audio sensor 108. In addition, the movement of the first actuator 406 moves the AV unit 104 from behind the electronic device 400 to slightly above an edge of the enclosure 404, along the direction 410. Thus, the AV unit 104 becomes visible to the user accessing the electronic device.

Further, the second actuator 408 is actuatable to move the AV unit 104 with respect to the base member 102 in a second direction 412. The user may manually actuate the second actuator 408. Such actuation of the second actuator 408 causes the second actuator 408 to contact the second switch. The pressing of the second switch activates the image sensor 106 and the audio sensor 108. Further, the movement of the second actuator 408 moves the AV unit 104 from behind the electronic device 400 to slightly above an edge of the enclosure 404, along the direction 412. As a result, the AV unit 104 becomes visible to the user accessing the electronic device.

The AV apparatus 402 may further include a biasing element (not shown). One end of the biasing element is coupled to the base member 102 and another end of the biasing element is coupled to the AV unit 104. When none of the first actuator 406 and the second actuator 408 is actuated, the biasing element facilitates in holding the AV unit 104 behind the enclosure 404 of the electronic device 400. Upon actuation of the first actuator 406 or the second actuator 408, the biasing element is biased to hold the AV unit 104 in a position associated with an actuated position of the first actuator 406 or the second actuator 408.

For example, to actuate the first actuator 406 or the second actuator 408, the user of the electronic device 400 may move the first actuator 406 or the second actuator 408 in an upward direction. The moved-up position of the first actuator 406 or the second actuator 408 may indicate the actuated position of the first actuator 406 or the second actuator 408. As the first actuator 406 and the second actuator 408 is coupled between the AV unit 104 and the base member 102, any movement of the first actuator 406 or the second actuator 408 may cause the AV unit 104 to move. Thus, upon actuation, when the first actuator 406 or the second actuator 408 are moved in the upward direction, the biasing element holds the AV unit 104 in a moved position corresponding to the actuated position of the first actuator 406 or the second actuator 408.

Although implementations of the audio-video apparatuses have been described in language specific to structural features and/or methods, it is to be understood that the present subject matter is not necessarily limited to the specific features or methods described. Rather, the specific features and methods are disclosed and explained in the context of a few example implementations of the audio-video apparatuses.

We claim:

1. An audio-video (AV) apparatus comprising:
a base member;
an AV unit including an image sensor and an audio sensor;
a frame member on which the AV unit is mounted;
an actuation unit coupled between the AV unit and the base member, the actuation unit being actuatable to:
move the AV unit, with respect to the base member, in a first direction and activate the audio sensor; and
move the AV unit, with respect to the base member, in a second direction and activate the image sensor and the audio sensor; and
a biasing element, one end of the biasing element being coupled to the base member and another end of the biasing element being coupled to the frame member, wherein upon actuation of the actuation unit, the biasing element is biased to hold the frame member in a position associated with an actuated position of the actuation unit.

2. The AV apparatus as claimed in of claim 1, wherein the AV unit comprises:
a first switch electrically coupled to the audio sensor; and
a second switch electrically coupled to the image sensor and the audio sensor.

3. The AV apparatus of claim 2, wherein the actuation unit comprises a first actuator, and wherein the first actuator, upon actuation, is to connect with the first switch to activate the audio sensor.

4. The AV apparatus of claim 3, wherein the actuation unit comprises a second actuator, and wherein the second actuator, upon actuation, is to connect with the second switch to activate the image sensor and the audio sensor.

5. The AV apparatus of claim 1, wherein the second direction is different from the first direction.

6. The AV apparatus of claim 1, wherein the biasing element is to hold the frame member behind an enclosure when the actuation unit is not actuated.

7. An audio-video (AV) apparatus comprising:
a base member;
a frame member;
an AV unit mounted on the frame member, the AV unit including an image sensor and an audio sensor;
a first actuator coupled to the base member and the frame member, the first actuator being actuatable to move the frame member, with respect to the base member, in a first direction and activate the audio sensor;
a second actuator coupled to the base member and the frame member, the second actuator being actuatable to move the frame member, with respect to the base member, in a second direction and activate the image sensor and the audio sensor; and
a biasing element, one end of the biasing element being coupled to the base member and another end of the biasing element being coupled to the frame member, wherein upon actuation of the first actuator or the second actuator, the biasing element is biased to hold the frame member in a position associated with an actuated position of the first actuator or the second actuator.

8. The AV apparatus of claim 7, wherein the biasing element is to hold the frame member behind an enclosure when the first actuator and the second actuator are not actuated.

9. The AV apparatus of claim 8, wherein the AV unit further comprises:
   a first switch electrically coupled to the audio sensor; and
   a second switch electrically coupled to the image sensor and the audio sensor.

10. The AV apparatus of claim 9, wherein the first actuator, upon actuation, is to contact the first switch to activate the audio sensor.

11. The AV apparatus of claim 10, wherein the second actuator, upon actuation, is to contact the second switch to activate the image sensor and the audio sensor.

12. An electronic device comprising:
   an enclosure; and
   an audio-video (AV) apparatus comprising:
      a base member coupled to the enclosure;
      an AV unit including an image sensor and an audio sensor; and
      a first actuator coupled between the AV unit and the base member, the first actuator being actuatable to move the AV unit, with respect to the base member, in a first direction and activate the audio sensor;
      a second actuator coupled between the AV unit and the base member, the second actuator being actuatable to move the AV unit, with respect to the base member, in a second direction and activate the image sensor and the audio sensor; and
      a biasing element, wherein the biasing element is coupled between the base member and the AV unit, wherein upon actuation of the first actuator or the second actuator, the biasing element is biased to hold the AV unit in a position associated with an actuated position of the first actuator or the second actuator.

13. The electronic device of claim 12, wherein the AV unit comprises a switching unit, the switching unit including:
   a first switch electrically coupled to the audio sensor; and
   a second switch electrically coupled to the image sensor and the audio sensor.

14. The electronic device of claim 13, wherein the first actuator is actuatable to contact the first switch to activate the audio sensor, and the second actuator is actuatable to contact with the second switch to activate the image sensor and the audio sensor.

15. The electronic device as claimed in claim 12, wherein the biasing element is to hold the AV unit behind the enclosure when the first actuator and the second actuator are not actuated.

16. The AV apparatus of claim 7, wherein the second direction is different from the first direction.

17. The electronic device of claim 12, wherein the second direction is different from the first direction.

* * * * *